(12) United States Patent
Wu et al.

(10) Patent No.: US 11,393,554 B2
(45) Date of Patent: Jul. 19, 2022

(54) DEVICE HOUSINGS WITH GLASS BEADS

(71) Applicant: HEWLETT-PACKARD DEVELOPMENT COMPANY, L.P., Spring, TX (US)

(72) Inventors: Kuan-Ting Wu, Taipei (TW); Ya-Ting Yeh, Taipei (TW); Chao-Wen Cheng, Taipei (TW); Hsin-Yi Lee, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/965,127

(22) PCT Filed: Apr. 11, 2018

(86) PCT No.: PCT/US2018/027000
§ 371 (c)(1),
(2) Date: Jul. 27, 2020

(87) PCT Pub. No.: WO2019/199292
PCT Pub. Date: Oct. 17, 2019

(65) Prior Publication Data
US 2021/0043270 A1    Feb. 11, 2021

(51) Int. Cl.
| | | |
|---|---|---|
| *G12B 9/04* | (2006.01) | |
| *C03C 27/04* | (2006.01) | |
| *A01N 55/02* | (2006.01) | |
| *C23C 18/31* | (2006.01) | |
| *C23C 20/02* | (2006.01) | |
| *A01N 59/16* | (2006.01) | |

(52) U.S. Cl.
CPC ............... *G12B 9/04* (2013.01); *A01N 55/02* (2013.01); *A01N 59/16* (2013.01); *C03C 27/048* (2013.01); *C23C 18/31* (2013.01); *C23C 20/02* (2013.01)

(58) Field of Classification Search
None
See application file for complete search history.

(56) References Cited

U.S. PATENT DOCUMENTS

| | | | |
|---|---|---|---|
| 6,248,342 | B1 | 6/2001 | Trogolo et al. |
| 2006/0019088 | A1 | 1/2006 | Wang et al. |
| 2010/0055157 | A1* | 3/2010 | Gunn ............... A61L 15/18 424/447 |
| 2012/0024712 | A1 | 2/2012 | Neumann et al. |
| 2015/0044482 | A1* | 2/2015 | Lee ............... G02B 1/115 428/426 |

(Continued)

FOREIGN PATENT DOCUMENTS

| | | |
|---|---|---|
| CN | 102186643 A | 9/2011 |
| DE | 102009046743 A1 | 5/2011 |

(Continued)

OTHER PUBLICATIONS

Title: Development of a transparent, non-cytotoxic, silver ion-exchanged glass with antimicrobial activity and lower ion elution Volume: Enzyme and Microbial Technology: vol. 72, pp. 65-71 Author: Gyu-InShim, Seong-HwanKim, Hyung-WooEom, Kwang-MahnKim, Se-YoungChoi Date: May 2015.

*Primary Examiner* — Anh Q Tran
(74) *Attorney, Agent, or Firm* — HPI Patent Department

(57) ABSTRACT

In one example, a device housing is described, which may include a base substrate and ion-exchanged glass beads disposed on an outer surface of the base substrate.

15 Claims, 7 Drawing Sheets

(56) References Cited

U.S. PATENT DOCUMENTS

| | | |
|---|---|---|
| 2015/0197609 A1 | 7/2015 | Morizur |
| 2015/0359946 A1 | 12/2015 | Dehnad |
| 2016/0187258 A1* | 6/2016 | Mlekicki ............ G01N 21/6408 |
| | | 250/252.1 |
| 2017/0079264 A1* | 3/2017 | Ferrari ................... A01N 25/10 |
| 2017/0312399 A1 | 11/2017 | Dehnad |
| 2018/0027819 A1 | 2/2018 | Campbell, Jr. |

FOREIGN PATENT DOCUMENTS

| | | |
|---|---|---|
| KR | 100789470 B1 | 1/2008 |
| KR | 101526143 B1 | 6/2013 |

\* cited by examiner

DEVICE HOUSINGS WITH GLASS BEADS

BACKGROUND

Electronic devices such as notebook computers, tablet computers, MP3 players, personal digital assistances (PDAs), mobile phones, and the like may include housings to house various electronic components. To make the electronic devices fashionably and aesthetically appealing to users, decorative metallic-appearing coatings may be formed on the housings of electronic devices.

BRIEF DESCRIPTION OF THE DRAWINGS

Examples are described in the following detailed description and in reference to the drawings, in which.

DETAILED DESCRIPTION

Decorative metallic-appearing coatings may be formed on articles (e.g., housings of electronic devices). The metallic-appearing coatings may also provide a metallic luster. However, the metallic-appearing coating surface may be susceptible to contamination with microbes, and therefore may cause bacterial, viral, fungal, or other undesirable infections to users. Some example device housings may be coated with paints, which include silver powder in the painting formulation in an effort to reduce microbial activity. However, a surface of the silver powder may be covered by a resin, which can reduce the ability for the powder to provide the anti-microbial effect.

Examples described herein may provide an anti-microbial glass bead surface on a device housing. The anti-microbial glass beads can be sprayed and then stabilized on an adhesive layer of the device housing. Example anti-microbial glass beads may include silver ion-exchanged glass beads. For example, the anti-microbial activity or effect of a silver ion-exchanged glass bead against bacteria and fungi may be about 99.9%. In addition, examples described herein may provide a glass bead texture surface finish on a metal substrate (e.g., an anodized aluminum/aluminum alloy substrate), which can maintain metallic luster, provide a tactile touch feeling, and provide a high abrasion-resistant surface finish. Examples described herein may be implemented in electronic devices such as tablets, notebooks, personal digital assistants (PDAs), smart phones, healthcare devices, and the like.

In the following description, for purposes of explanation, numerous specific details are set forth in order to provide a thorough understanding of the present techniques. It will be apparent, however, to one skilled in the art that the present apparatus, devices and systems may be practiced without these specific details. Reference in the specification to "an example" or similar language means that a particular feature, structure, or characteristic described may be included in at least that one example, but not necessarily in other examples.

Examples described herein may provide a device housing, which may include a base substrate and ion-exchanged glass beads disposed on the base substrate. In one example, the ion-exchanged glass beads may have an anti-microbial property or effect.

Figure 1:
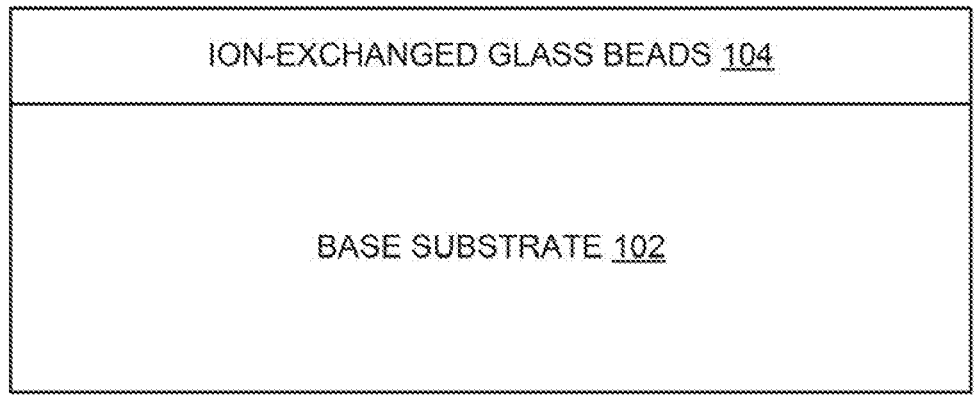
FIG. 1 illustrates a schematic representation of an example device housing having ion-exchanged glass beads disposed on an outer surface.

Turning now to the figures, FIG. 1 illustrates a schematic representation of an example device housing 100 having ion-exchanged glass beads 104 disposed on an outer surface. Example device housing 100 may be a housing of a computing device (e.g., a notebook, a tablet, a smart phone, or the like), a healthcare device, or the like.

Example device housing 100 may include a base substrate 102. For example, base substrate 102 may include a metal, a metal alloy, a carbon fiber, a plastic, or any combination thereof. Further, device housing 100 may include ion-exchanged glass beads 104 disposed on an outer surface of base substrate 102. In one example, ion-exchanged glass beads 104 may have an anti-microbial property. Example ion-exchanged glass beads 104 may include silver ion-exchanged glass beads.

In one example, ion-exchanged glass beads 104 may be disposed on the outer surface of base substrate 102 via an adhesive layer. In another example, device housing 100 may include a film having a first surface adhered to the outer surface of base substrate 102 and a second surface opposite to the first surface. In this example, ion-exchanged glass beads 104 may be disposed on the second surface of the film. This is explained in FIG. 2.

Figure 2:
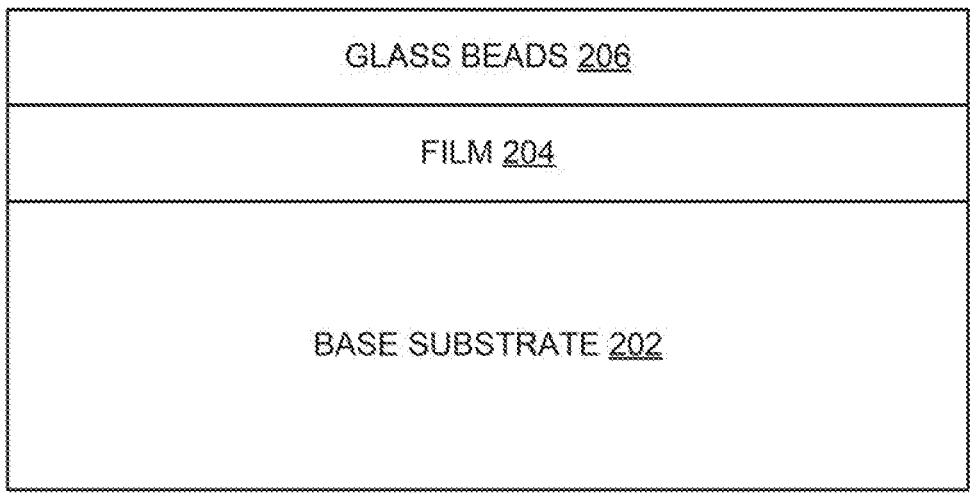
FIG. 2 illustrates a schematic representation of an example device housing, depicting a film with glass beads disposed on a base substrate via a molding process.

FIG. 2 illustrates a schematic representation of an example device housing 200, depicting a film 204 with glass beads 206 disposed on a base substrate 202 via a molding process. Example device housing 200 may be a housing of a mobile phone, personal digital assistant (PDA), notebook computer, tablet computer, MP3 or MP4 player, global positioning system (GPS) navigator, digital camera, convertible device, a personal gaming device, a medical device, or the like.

Device housing 200 may include a film 204 and glass beads 206 adhered on film 204, for instance, via an adhesive layer. For example, film 204 may include a plastic, a carbon fiber, or a combination thereof. Further, glass beads 206 may include ion-exchanged glass beads. Example ion-exchanged glass beads may include silver ion-exchanged glass beads having an anti-microbial activity. For example, glass beads 206 may impart a three-dimensional feeling to device housing 200 and enhance the aesthetic appearance by reflection of light. An example process for forming glass beads 206 on film 204 is explained in FIGS. 3A and 3B.

Further, device housing 200 may include base substrate 202. Example base substrate 202 may include a metal, a metal alloy, a carbon fiber, a plastic, or any combination thereof. In one example, film 204 with glass beads 206 may be applied on an outer surface of base substrate 202 using a molding process. Example molding process may include an in-mold decoration process or an out-mold decoration process. An example in-mold decoration process is explained in FIG. 4A and example out-mold decoration processes are explained in FIGS. 4B and 4C.

In other examples, device housing 200 may include an intermediate layer disposed between base substrate 202 and film 204. Example intermediate layer may be a corrosion resistance layer such as a passivation layer, a micro arc oxidation layer, an anodized layer, or any combination thereof. Example intermediate layers are explained in FIGS. 6-9.

Figure 3A:
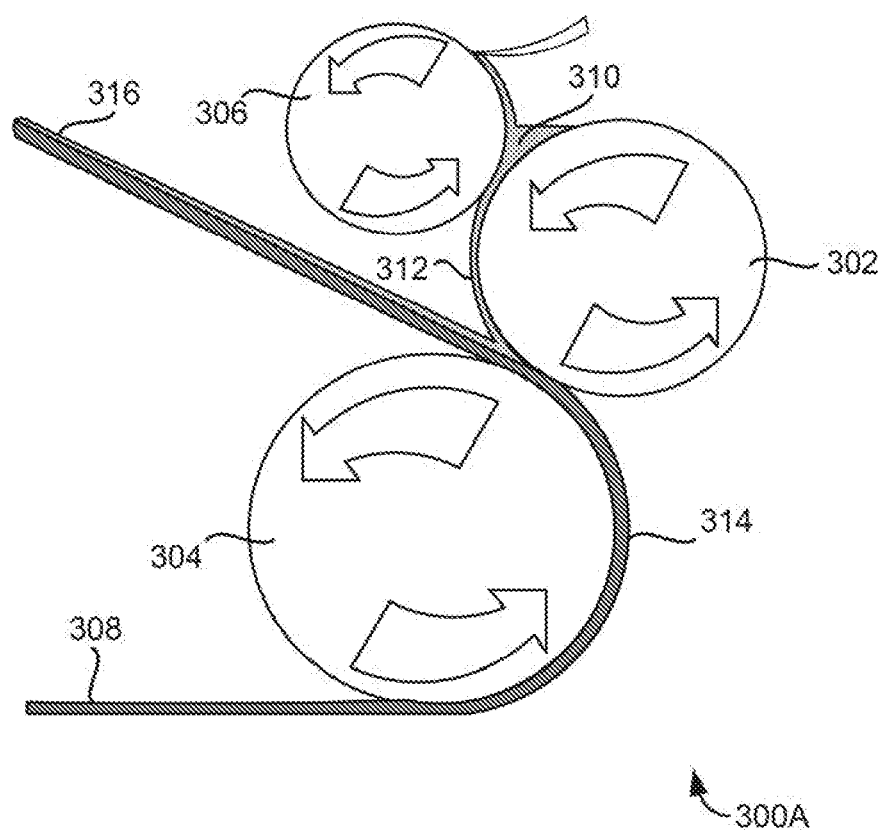
FIGS. 3A and 3B illustrate example processes for forming glass beads on a film.
Figure 3B:
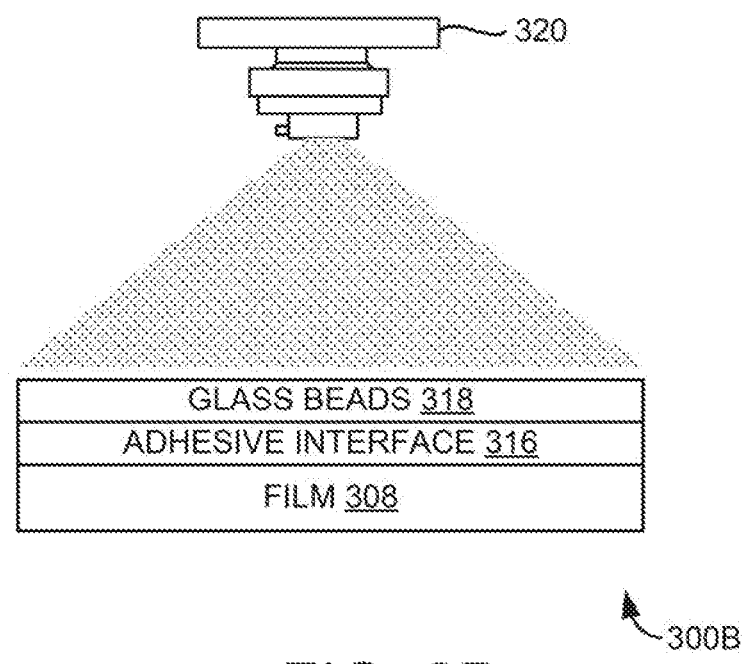

FIGS. 3A and 3B illustrate example processes for forming glass beads 318 on a film 308. FIG. 3A illustrates an example roller coating apparatus 300A for forming an adhesive interface 316 on film 308 (e.g., film 204 as shown in FIG. 2). As indicated in FIG. 3A, roller coating apparatus 300A may include an application roller 302, a support roller 304, and a metering roller 306. During the coating process, support roller 304 may rotate in a counterclockwise direction (e.g., in the orientation as shown in FIG. 3A) to draw a continuous film 308 past application roller 302, which may rotate in the same direction as support roller 304.

Further, supported by application roller 302 and metering roller 306 is a quantity of adhesive 310. A thin layer 312 of adhesive, having a thickness equal to a size of a gap formed between application roller 302 and metering roller 306, may form on a surface of application roller 302, which carries adhesive 310 to a surface 314 of film 308, thereby resulting in an adhesive interface 316 being deposited on surface 314 of film 308.

FIG. 3B illustrates an example schematic 300B, depicting a spraying apparatus 320 for spraying glass beads 318 (e.g., glass beads 206 as shown in FIG. 2) on adhesive interface 316. Upon spraying, glass beads 318 can be stabilized on adhesive interface 316 of film 308. Further, film 308 with glass beads 318 may be attached to a base substrate using an in-mold decoration process or an out-mold decoration process as shown in FIGS. 4A-4C.

Figure 4A:
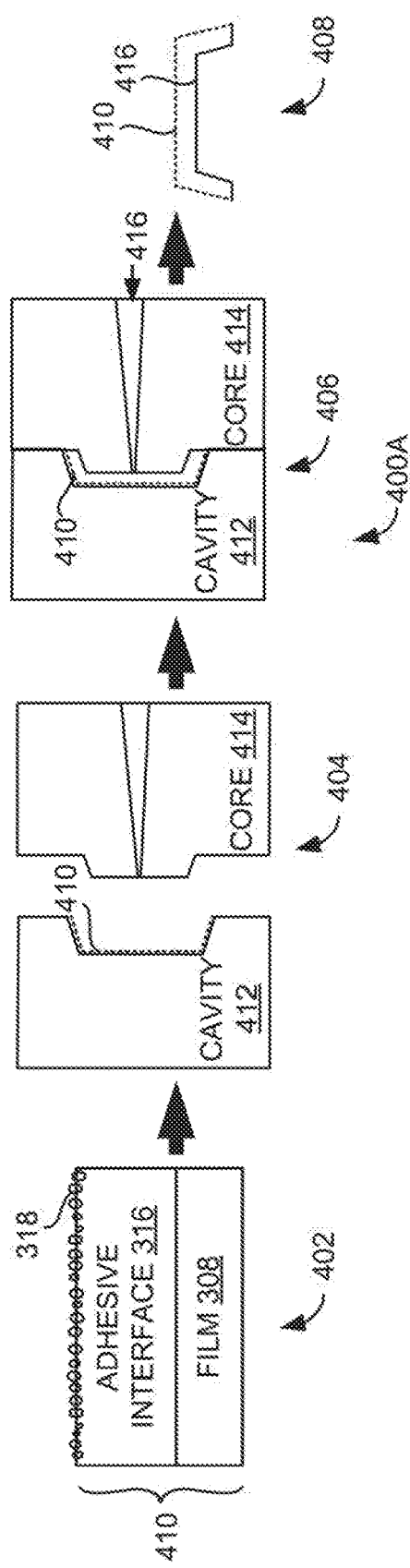
FIG. 4A illustrates an example in-mold decoration process for applying a film with glass beads to a base substrate.

FIG. 4A illustrates an example in-mold decoration process 400A for applying a film with glass beads on a base substrate. The term "in-mold decoration process" may refer to inserting a film with glass beads into a mold and then injecting, hardening, and adhering a liquid substrate onto the film to form a decorated product during a molding cycle.

At 402, film 308 with glass beads 318 on a first surface (hereinafter referred to as "decorated film 410") may be provided. As shown in FIG. 4A, the mold may be composed of a cavity 412 and a core 414. Example cavity 412 may be a concave cavity plate. Example core 414 may be a convex core plate. At 404, decorated film 410 may be inserted into cavity 412. At 406, after closing the mold, a liquid base substrate 416 may be injected through core 414 into the space between cavity 412 and core 414. Further, liquid base substrate 416 may be hardened and adhered to a second surface (i.e., opposite to the first surface) of film 308. Example liquid base substrate may include a liquid plastic or a liquid metal. Thus, as shown in 408, the device housing with decorated film 410 on the outer surface of base substrate 416 may be formed during the molding cycle of base substrate 416.

Figure 4B:
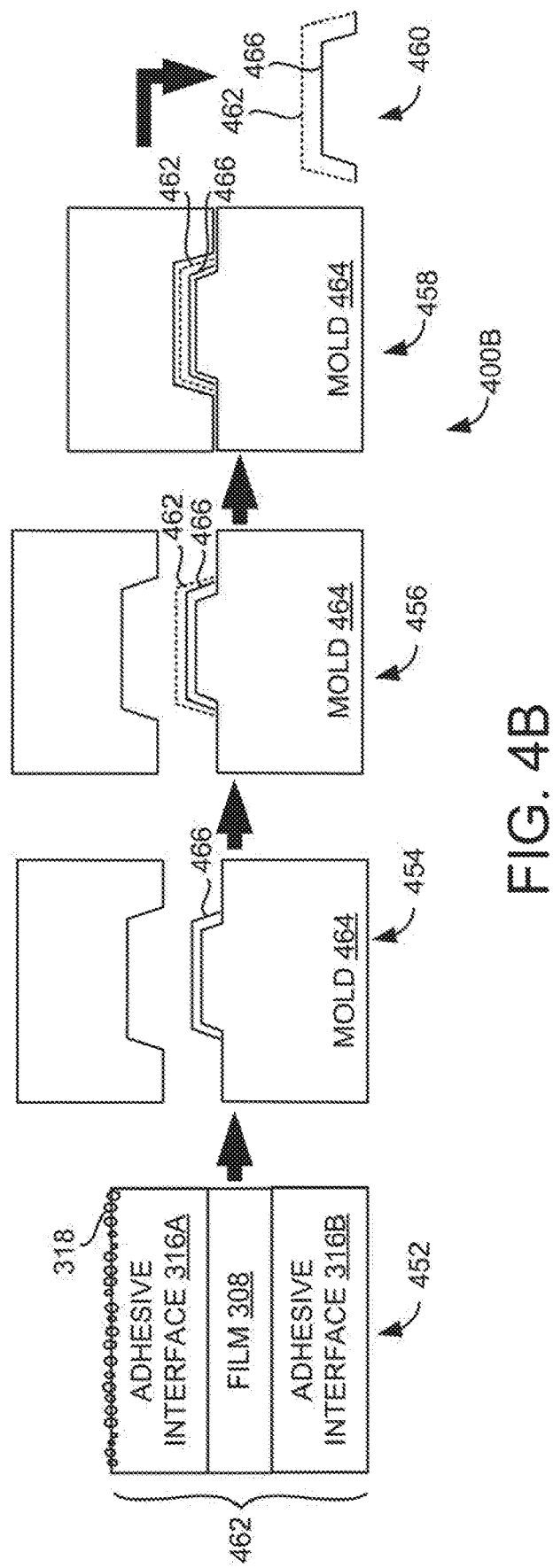
FIGS. 4B and 4C illustrate example out-mold decoration processes for applying a film with glass beads to a base substrate.
Figure 4C:
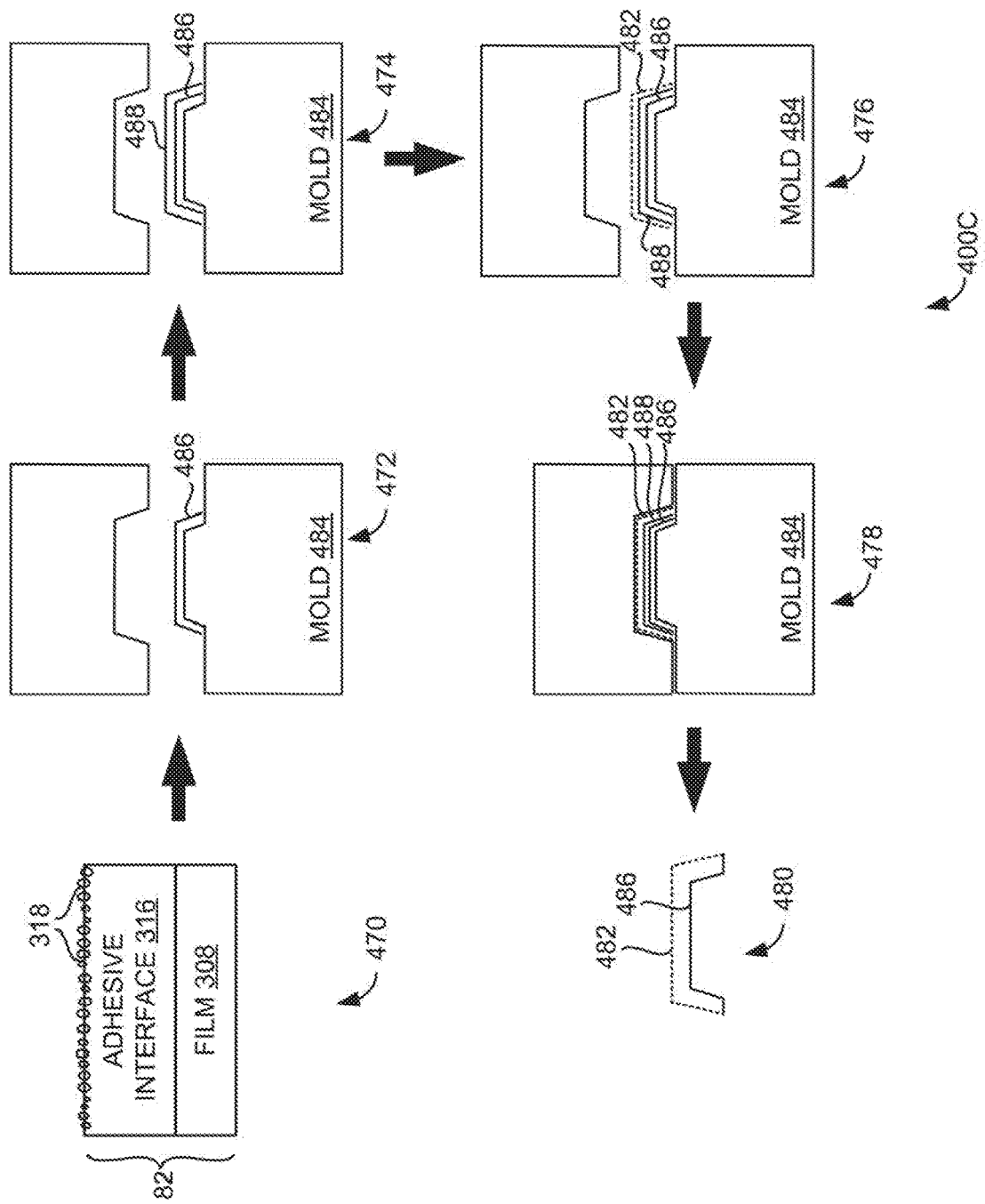

FIGS. 4B and 4C illustrate example out-mold decoration processes for applying a film with glass beads on a base substrate. FIG. 4B illustrates an example out-mold decoration process 400B for disposing film 308 with adhesive interface 316B on a base substrate. The term "out-mold decoration process" may refer to molding the film (e.g., with glass beads) on the outer surface of the base substrate using a high-pressure vacuum transfer. Example base substrate may include a plastic, a metal, or a carbon fiber substrate.

At 452, film 308 with glass beads 318 disposed on a first surface via an adhesive interface 316A and an adhesive interface 316B on a second surface (hereinafter referred to as "decorated film 462") may be provided. At 454, a base substrate 466 may be inserted into mold 464. The base substrate 466 may be formed using a previous molding process or other manufacturing process. At 456, decorated film 462 may be inserted into mold 464 such that decorated film 462 may be placed on base substrate 466 via adhesive interface 316B. At 458, decorated film 462 and base substrate 466 may be compressed in mold 464 using a high-pressure vacuum transfer. As shown in 460, the device housing with decorated film 462 on the outer surface of base substrate 466 may be formed.

FIG. 4C illustrates another example out-mold decoration process 400C for disposing a film 308 on a base substrate. At 470, film 308 with glass beads 318 disposed on a first surface via an adhesive interface 316 (hereinafter referred to as "decorated film 482") may be provided. At 472, a base substrate 486 may be inserted into mold 484. At 474, an adhesive interface 488 may be sprayed on base substrate 486. At 476, decorated film 482 may be inserted into mold 484 such that decorated film 482 may be placed on base substrate 486 via adhesive interface 488. At 478, decorated film 482 and base substrate 486 may be compressed in mold 484 using a high-pressure vacuum transfer to directly bond decorated film 482 and base substrate 486. As shown in 480, the device housing with decorated film 482 on the outer surface of base substrate 486 may be formed.

Figure 5A:
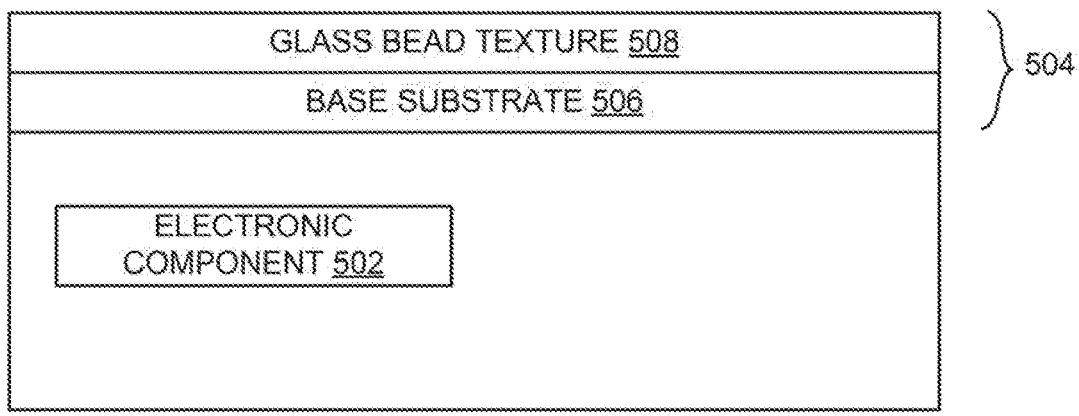
FIGS. 5A and 5B illustrate schematic representations of cross-sectional side-views of an example electronic device, depicting a glass bead texture on an outer surface of a device housing.

FIG. 5A illustrates a schematic representation of a cross-sectional side-view of an example electronic device 500, depicting a glass bead texture 508 on an outer surface of a device housing 504. Example electronic device 500 may be a mobile phone, personal digital assistant (PDA), notebook computer, tablet computer, MP3 or MP4 player, global positioning system (GPS) navigator, digital camera, convertible device, personal gaming device, medical device, or the like. Example convertible device may refer to a device that can be "converted" from a laptop mode to a tablet mode. In some examples, electronic device 500 may include a first housing and a second housing rotatably, detachably, or twistably connected to the first housing. Examples described herein can be implemented in the first housing, second housing, or a combination thereof.

Example electronic device 500 may include an electronic component 502 and housing 504 to house electronic component 502. In some examples, electronic component 502 may be a display (e.g., a touchscreen display). Example display may include liquid crystal display (LCD), light emitting diode (LED), electro-luminescent (EL) display, or the like. In other examples, electronic component 502 may include an antenna, a processor, a memory, a battery, a graphics processor, a camera, an input/output device (e.g., a keyboard, a touch pad, and the like), an audio/video device, and the like, depending on the functions of electronic device 500.

Housing 504 may include a base substrate 506. Example base substrate 506 may include a metal, a metal alloy, a carbon fiber, a plastic, or any combination thereof. Further, housing 504 may include glass bead texture 508 formed on an outer surface of base substrate 506, glass bead texture 508 including ion-exchanged glass beads.

In one example, glass bead texture 508 having the ion-exchanged glass beads may be formed on the outer surface of base substrate 506 via an adhesive layer. In another example, glass bead texture 508 may be formed on the outer surface of base substrate 506 via a film as shown in FIG. 5B.

Figure 5B:
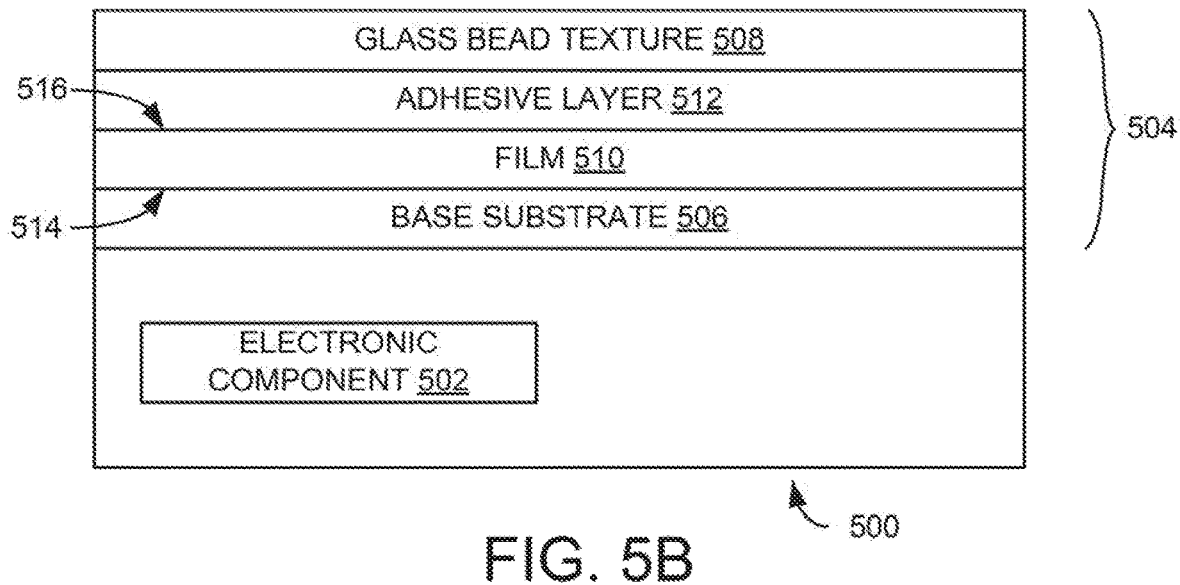

FIG. 5B illustrates a schematic representation of a cross-sectional side-view of example electronic device 500, depicting additional features. Housing 504 may include a film 510. Film 510 may include a first surface 514 and a second surface 516 opposite to first surface 514.

Housing 504 may include an adhesive layer 512 disposed on second surface 516 of film 510. Housing 504 may include glass bead texture 508 (e.g., pattern design or a uniform design) formed on second surface 516 of the film 510 via adhesive layer 512. Further, film 510 with glass bead texture 508 may be disposed on base substrate 506 via an in-mold decoration process or an out-mold decoration process, which may apply film 510, and thus the glass bead texture 508, to base substrate 506.

Example ion-exchanged glass beads may include silver ion-exchanged glass beads having an anti-microbial activity or quality. Further, glass bead texture 508 on the surface of housing 504 can improve the three-dimensional feeling and the aesthetic appearance of electronic device 500.

Figure 6:
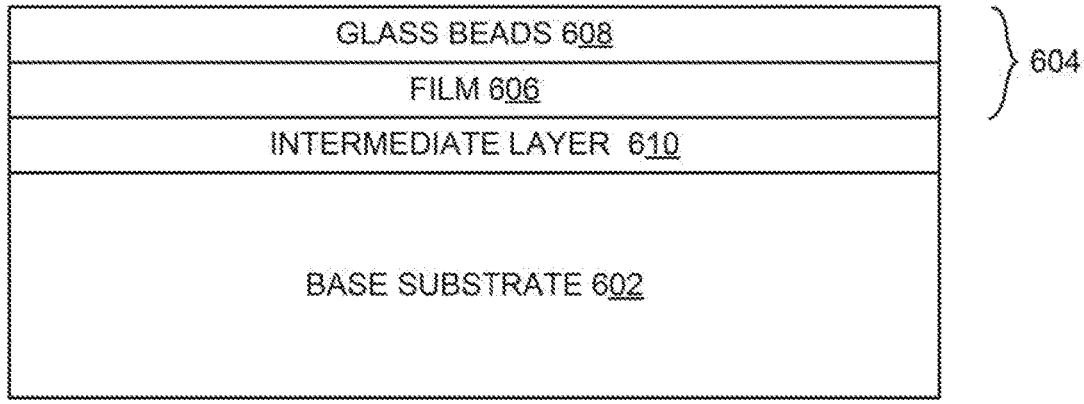
FIG. 6 illustrates a schematic representation of an example device housing, depicting an intermediate layer disposed between a base substrate and a film with glass beads.

FIG. 6 illustrates a schematic representation of an example device housing 600, depicting an intermediate layer 610 disposed between a base substrate 602 and a decorated film 604. In one example, decorated film 604 may include a film 606 and glass beads 608 adhered on film 606. Device housing 600 may include base substrate 602 and intermediate layer 610 disposed on base substrate 602. Further, device housing 600 may include decorated film 604 disposed on intermediate layer 610 using a molding process (e.g., an out-mold decoration process). Example intermediate layer 610 may be a corrosion resistance layer. Example intermediate layer 610 may be a passivation layer, a micro arc oxidation layer, an anodized layer, or any combination thereof.

For example, intermediate layer 610 may have a smooth surface for enhancing bonding between base substrate 602 and decorated film 604. In some examples, intermediate layer 610 can be omitted, and decorated film 604 can be directly formed on base substrate 602. Example intermediate layers may be explained in FIGS. 7-9.

Figure 7:
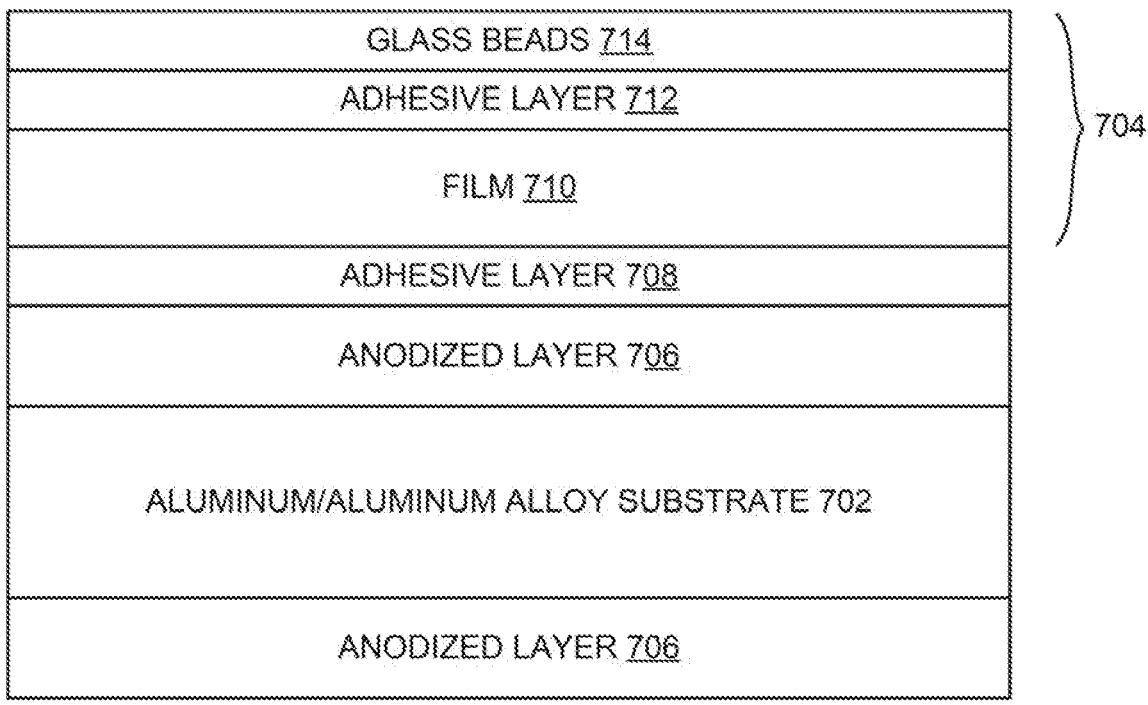
FIG. 7 illustrates a schematic representation of an example device housing, depicting a film with glass beads in combination with an anodized layer on an aluminum/aluminum alloy substrate.

FIG. 7 illustrates a schematic representation of an example device housing 700, depicting a decorated film 704 in combination with an anodized layer 706 on an aluminum/aluminum alloy substrate 702. Device housing 700 may include aluminum/aluminum alloy substrate 702 and an anodized layer 706 formed on opposite surfaces of aluminum/aluminum alloy substrate 702. Further, device housing 700 may include decorated film 704 disposed on anodized layer 706 via adhesive layer 708 using a molding process (i.e., an out-mold decoration process). In one example, decorated film 704 may include a film 710 disposed on anodized layer 706 and glass beads 714 adhered on film 710 via adhesive layer 712. In one example, decorated film 704 with glass beads 714 (e.g., glass bead texture) on anodizing aluminum/aluminum alloy substrate 702 can maintain metallic luster, provide glass bead texture tactile touch feeling, and provide a high abrasion-resistant surface finish.

Figure 8:
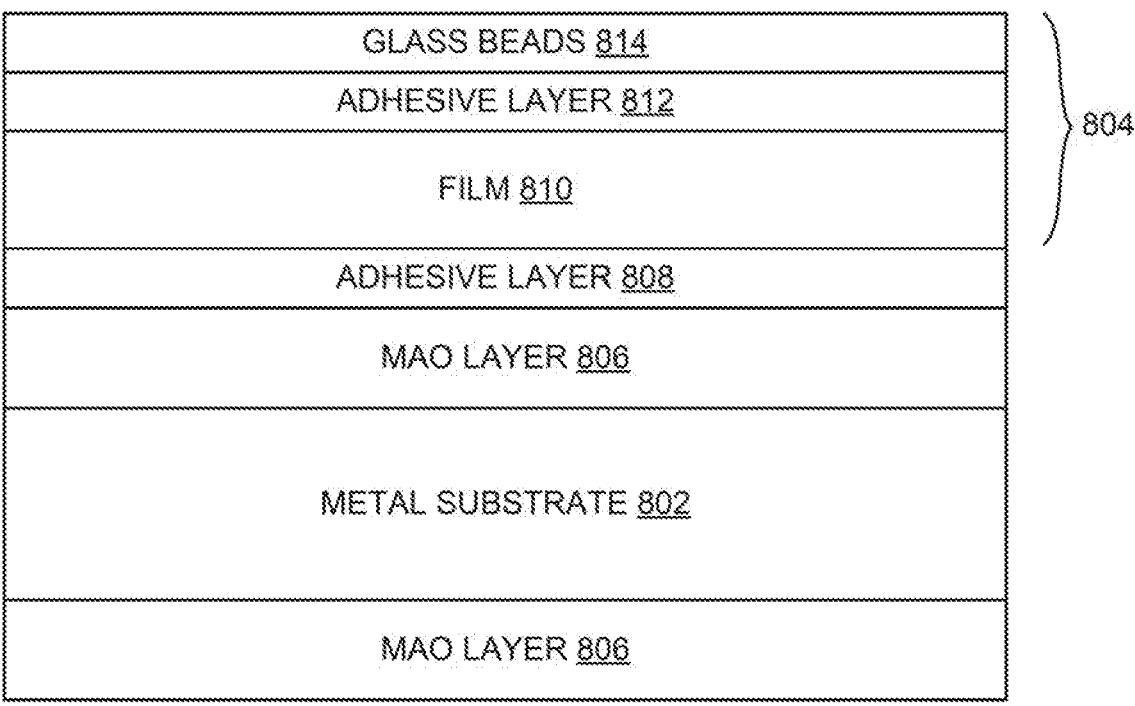
FIG. 8 illustrates a schematic representation of an example device housing, depicting a film with glass beads in combination with a micro-arc oxidation (MAO) layer on a metal substrate.

FIG. 8 illustrates a schematic representation of an example device housing 800, depicting a decorated film 804 in combination with a micro-arc oxidation (MAO) layer 806 on a metal substrate 802. Example metal substrate 802 may be a forged/die casted/CNC machined metal alloy. Example metal may include an aluminum, magnesium, titanium, lithium, niobium, or associated alloy. In one example, metal substrate 802 may be formed into a desired shape by forging, die casting, or CNC machining.

As shown in FIG. 8, MAO layer 806 may be formed on opposite surfaces of metal substrate 802. For example, MAO layer 806 may be formed on metal substrate 802 using an MAO process, which may be an electrochemical surface treatment process for generating oxide coatings on metals.

Device housing 800 may include decorated film 804 disposed on MAO layer 806 via adhesive layer 808 using a molding process (i.e., an out-mold decoration process). In one example, decorated film 804 may include a film 810 and glass beads 814 adhered on film 810 via adhesive layer 812. Micro-arc oxidized metal substrate 802 may include properties such as wearing resistance, corrosion resistance, high hardness, and electrical insulation.

Figure 9:
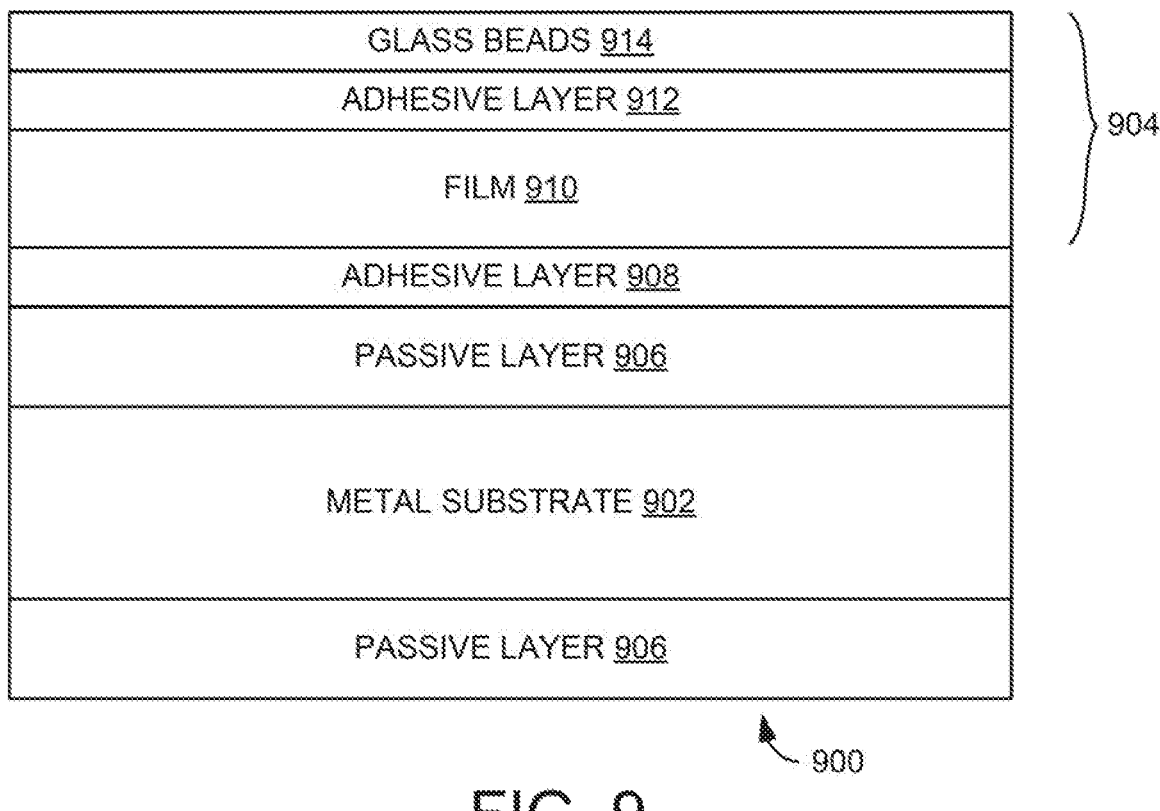
FIG. 9 illustrates a schematic representation of an example device housing, depicting a film with glass beads in combination with a passive layer on a metal substrate.

FIG. 9 illustrates a schematic representation of an example device housing 900, depicting a decorated film 904 in combination with a passive layer 906 on a metal substrate 902. Example metal substrate 902 may be a forged/die casted/CNC machined magnesium alloy. FIG. 9 depicts passive layer 906 formed on opposite surfaces of metal substrate 902 and decorated film 904 formed on passive layer 906 via adhesive layer 908 using a molding process (e.g., an out-mold decoration process). In one example, decorated film 904 may include a film 910 disposed on passive layer 906 and glass beads 914 adhered on film 910 via adhesive layer 912. Passive layer 906 may involve creation of an outer layer of shield material around metal substrate 902 to make metal substrate 902 "passive", i.e., less affected or corroded by the environment.

Figure 10:
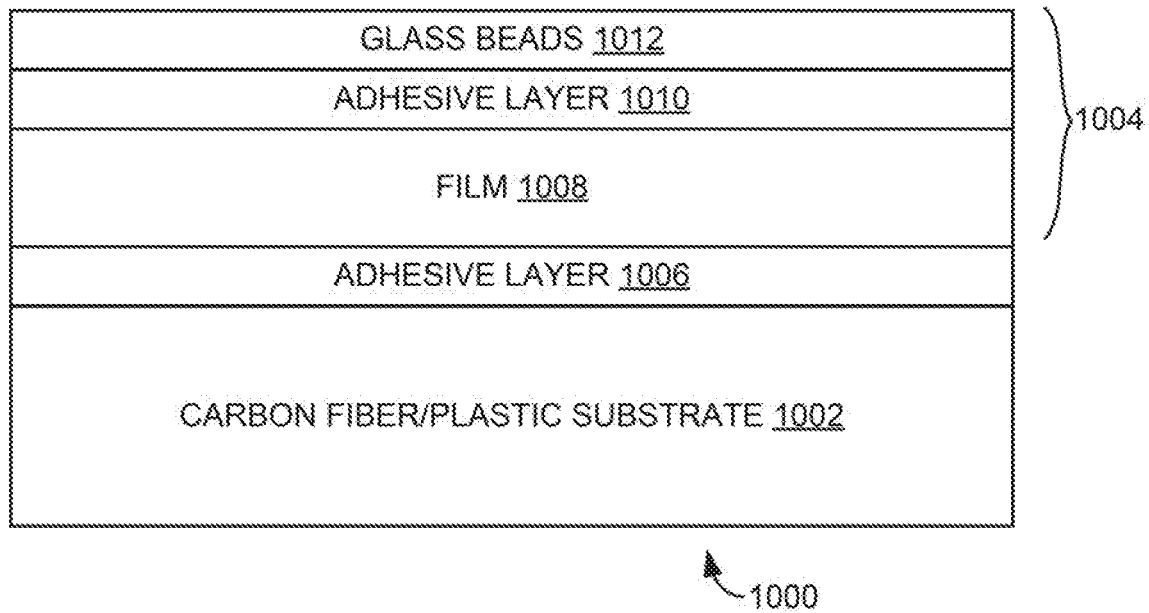
FIG. 10 illustrates a schematic representation of an example device housing, depicting a film with glass beads on a carbon fiber/plastic substrate.

Alternatively, the decorated film can be directly disposed on the base substrate without any intermediate coatings as shown in FIG. 10. FIG. 10 illustrates a schematic representation of an example device housing 1000, depicting a decorated film 1004 disposed on a carbon fiber/plastic substrate 1002 via adhesive layer 1006. In one example, decorated film 1004 may include a film 1008 and glass beads 1012 adhered on film 1008 via adhesive layer 1010.

Thus, examples described in FIGS. 1-10 may provide an anti-microbial surface of a device housing, which can have along-lasting reliable antiseptic effect. Further, examples described in FIGS. 1-10 may provide a device housing having an anti-microbial activity, which can be maintained for a significant time.

It may be noted that the above-described examples of the present solution are for the purpose of illustration only. Although the solution has been described in conjunction with a specific implementation thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A device housing comprising:
   a base substrate; and
   ion-exchanged glass beads disposed and stabilized on an adhesive layer that is disposed on an outer surface of the base substrate, wherein the ion-exchanged glass beads form a three-dimensional tactile touch feeling over the outer surface of the base substrate.

2. The device housing of claim 1, wherein the base substrate includes a metal, a metal alloy, a carbon fiber, a plastic, or any combination thereof.

3. The device housing of claim 1, further comprising:
   a film comprising:
      a first surface adhered to the outer surface of the base substrate; and
      a second surface opposite to the first surface, wherein the ion-exchanged glass beads are disposed on the second surface.

4. The device housing of claim 1, further comprising an anodized layer between the base substrate and the adhesive layer.

5. The device housing of claim 1, wherein the ion-exchanged glass beads have an anti-microbial property, and wherein the ion-exchanged glass beads comprise silver ion-exchanged glass beads.

6. A device housing comprising:
   a film;
   glass beads adhered on the film; and
   a base substrate, wherein the film with the glass beads is applied on an outer surface of the base substrate using a molding process, wherein the glass beads form a three-dimensional tactile touch feeling over the outer surface of the base substrate.

7. The device housing of claim 6, wherein the molding process comprises an in-mold decoration process or an out-mold decoration process.

8. The device housing of claim 6, further comprising:
   an intermediate layer disposed between the base substrate and the film; wherein the intermediate layer comprises a passivation layer, a micro arc oxidation layer, an anodized layer, or any combination thereof.

9. The device housing of claim 6; wherein the film is a plastic, a carbon fiber, or a combination thereof.

10. The device housing of claim 6, wherein the glass beads comprise ion-exchanged glass beads, wherein the ion-exchanged glass beads comprise silver ion-exchanged glass beads having an anti-microbial activity.

11. An electronic device comprising:
    an electronic component; and
    a housing to house the electronic component, wherein the housing comprises:
       a base substrate; and
       a glass bead texture formed and stabilized on an adhesive layer that is disposed on an outer surface of the base substrate using ion-exchanged glass beads, wherein the ion-exchanged glass beads form a three-dimensional tactile touch feeling over the outer surface of the base substrate.

12. The electronic device of claim 11, further comprising:
    a film, wherein the glass bead texture is formed on the film, and wherein the film with the glass bead texture is disposed on the base substrate via an in-mold decoration process or an out-mold decoration process.

13. The electronic device of claim 12, wherein the housing further comprises an intermediate layer disposed between the base substrate and the film, and wherein the intermediate layer comprises a corrosion resistance layer.

14. The electronic device of claim 12, further comprising an anodized layer between the base substrate and the adhesive layer.

15. The electronic device of claim 14, wherein the ion-exchanged glass beads comprise silver ion-exchanged glass beads having an anti-microbial activity.

* * * * *